United States Patent
Ambrogi et al.

[15] 3,669,966
[45] June 13, 1972

[54] PYRAZINE DERIVATIVES AND PROCESS FOR THEIR PREPARATION

[72] Inventors: Vittorio Ambrogi, Bresso; Willy Logemann, Milan, both of Italy

[73] Assignee: Carlo Erba S.p.A., Milan, Italy

[22] Filed: March 24, 1970

[21] Appl. No.: 22,389

[30] Foreign Application Priority Data

June 18, 1969 Italy..................................18301 A/69
March 26, 1969 Italy..................................14581 A/69

[52] U.S. Cl. ..........................................260/250 R, 424/250
[51] Int. Cl. ..........................................C07d 99/24
[58] Field of Search ..............................260/250 R

[56] References Cited
UNITED STATES PATENTS 3,501,464  3/1970  Camerino et al...................260/250 R
3,573,305  3/1971  Cragoe et al........................260/250 R

*Primary Examiner*—Nicholas S. Rizzo
*Attorney*—Cushman, Darby & Cushman

[57] ABSTRACT

Pyrazine derivatives wherein a pyrazine ring is introduced into benzenesulphonyl-urea compounds, typified by the compound

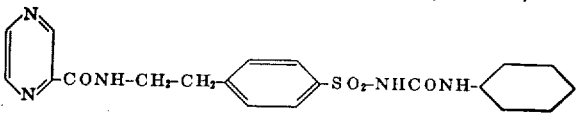

are disclosed. These compounds have hypoglycemic properties and are useful in the treatment of diabetic conditions.

15 Claims, No Drawings

PYRAZINE DERIVATIVES AND PROCESS FOR THEIR PREPARATION

BACKGROUND OF THE INVENTION

Sulphonylurea and biguanide derivatives have been used in recent years in diabetes therapy. These drugs can be given by mouth either separately or in combination. The daily doses required for humans is approximately 200 mg to 2–3 g. These doses are rather high, so that these drugs cannot be said to act at doses at the same level as do the hormones produced in the human body.

SUMMARY OF THE INVENTION

The introduction of a pyrazine ring into benzenesulphonyl-urea compounds produces pyrazine derivatives having hypoglycemic properties at low levels — e.g., at dosages of only a few milligrams.

DESCRIPTION OF THE INVENTION

The pyrazine derivatives of this invention are of the formula:

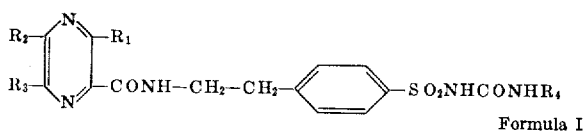

Formula I wherein $R_1$, $R_2$ and $R_3$ are independently selected from the group consisting of hydrogen, halogen, alkyl and alkoxy of one to six carbon atoms, hydroxy, amino, acetylamino and phenyl, wherein the alkyl, alkoxy and phenyl radicals may be substituted by at least one member selected from the group consisting of halogen, lower alkyl and lower alkoxy, and $R_4$ is selected from the group consisting of lower alkyl of one to four carbon atoms, lower alkenyl of one to four carbon atoms, cycloaliphatic and substituted cycloaliphatic, preferably cycloalkyl and substituted cycloalkyl wherein the cyclic ring contains five to eight carbon atoms preferably five to six carbon atoms, and may be substituted by lower alkyl or lower alkoxy. Typical examples of $R_1$, $R_2$ and $R_3$ may be, for instance, chlorine, fluorine, ethyl, propyl, isopropyl, butyl, isobutyl, ethoxy, propoxy, butoxy and the like. Typical examples of $R_4$ include ethyl, propyl, isopropyl, butyl, isobutyl, allyl, cyclopentyl, cyclohexyl, methylcyclohexyl, ethoxycyclohexyl and the like.

Specific examples of compounds of the present invention, exhibiting hypoglycemic activity, are N-{4-[β-(pyrazine-2-carboxyamido)-ethyl]-benzene-sulphonyl} -N'-cyclo-hexyl-urea; N-{4-[β-(6-methoxy-pyrazine-2-carboxy-amido)-ethyl]-benzene-sulphonyl}-N'-cyclo-hexyl-urea; N-{4-[β-(6-chloro-pyrazine-2-carboxy-amido)-ethyl]-benzene-sulphony}-N'-cyclo-hexyl-urea; N-{4-[β-(5-methyl-pyrazine-2-carboxy-amido)-ethyl]-benzene-sulphonyl}-N'-cyclo-hexyl-urea; N-{4-[β-(2,3-dimethyl-pyrazine-5-carboxy-amido)-ethyl]-benzene-sulphonyl}-N'-cyclo-hexyl-urea; N-{4-[β-(3-chloro-pyrazine-2-carboxy-amido)-ethyl]-benzene-sulphonyl}-N'-cyclo-hexyl-urea; N-{4-[β-(2-chloro-5,6-dimethyl-pyrazine-3-carboxy-amido)-ethyl]-benzene-sulphonyl}-N'-cyclo-hexyl-urea; N-{4-[β-(3-methoxy-pyrazine-2-carboxy-amido)-ethyl]-benzene-sulphonyl}-N'-cyclo-hexyl-urea; N-{4-[β-(6-methyl-pyrazine-2-carboxy-amido)-ethyl]-benzene-sulphonyl}-N'-cyclo-hexyl-urea; and N-{4-[β-(5-methoxy-pyrazine-2-carboxy-amido)-ethyl]-benzene-sulphonyl}-N'-cyclo-hexyl-urea.

The compounds of this invention may be prepared by two different processes. The first process comprises reacting a compound of the formula:

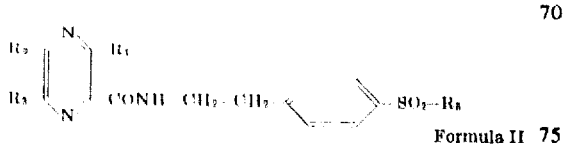

Formula II wherein $R_1$, $R_2$ and $R_3$ are as defined above and $R_5$ is an isocyanate or amino group, or a urethane or urea residue, with a compound of the formula $R_4Y$, wherein $R_4$ is defined as above and Y is an amine or isocyanate radical. Preferably, $R_5$ is selected from the group consisting of

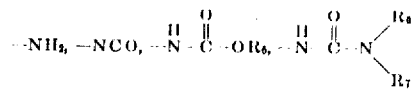

wherein $R_6$ is lower alkyl and $R_7$ is hydrogen or lower alkyl. The reaction is generally effected at temperatures of 0° to 200 °C., preferably 20° to 140° C. Although higher and lower pressures may be used, preferably the reaction is conducted at atmospheric pressure. Normally a reaction solvent will be utilized, and any inert solvents for the two reactants may be used, typical examples of which may be mentioned dioxane, acetone, xylol and chloroform. The compounds of FORMULA II may be obtained following the methods generally used for the preparation of the compounds of this class. Therefore they may be prepared:

a. when $R_5 = NH_2$, by reacting a compound of the formula

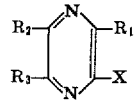

Formula III wherein $R_1$, $R_2$ and $R_3$ are as defined above and X is a carboxy group, an acid halide or a mixed anhydride, with the p-(β-amino-ethyl)-benzene-sulphonamide prepared by the method described in E. Miller, J. M. Sprague, L. W. Kissinger and L. F. McBurney, J. Am. Chem. Soc. 62, 2099 (1940), the disclosure of which is hereby incorporated by reference;

b. when $R_5 = -$ NCO, by reacting the pyrazine-carboxy-amido-ethyl-benzene-sulphonamides obtained according to the method cited in (a) with $COCl_2$ in 1,2,4-trichloro-benzene;

c. when

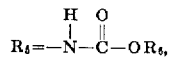

by reacting the pyrazine-carboxy-amido-ethyl-benzene-sulphonamides, obtained as in (a), or their salts with Cl-COOR$_6$, wherein $R_6$ is as defined above, according to the method described in F. J. Marshall and M. V. Sigal, J. Org. Chem. 23, 923 (1958), the disclosure of which is hereby incorporated by reference;

d. when

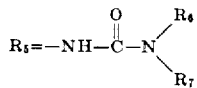

by reacting the pyrazine-carboxy-amido-ethyl-benzene-sulphonamides, obtained as in (a), with alkaline cyanates or the urethanes mentioned in (c) with amines substituted with $R_6$ and $R_7$, wherein $R_6$ and $R_7$ are as defined above.

The compound of FORMULA III may be prepared by the method described in S. Gabriel and A. Sonn, Ber. 40, 4850 (1907) or by the method described in D. Pitre, S. Boveri and E. B. Grabitz, Ber. 99, 364 (1966), the disclosures of which are hereby incorporated by reference.

The alternative method of preparing the compounds of the present invention is reacting a compound of the formula:

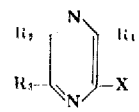

Formula III wherein $R_1$, $R_2$ and $R_3$ are as defined above and X is a carboxy group, an acid halide or a mixed anhydride, with a compound of the formula:

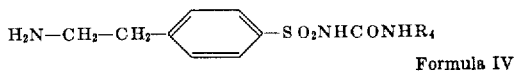

Formula IV wherein $R_4$ is as defined above. The reaction of the compound of FORMULA III and the compound of FORMULA IV is generally conducted at temperatures of 0° to 160 °C., preferably 0° to 110 °C. The reaction is conducted in an inert reaction solvent, as defined above, and is preferably at atmospheric pressure, although higher and lower pressures can be used as desired.

The compound of FORMULA III may be prepared by the method cited above and the compound of FORMULA IV may be prepared by the method described in Tstomu Momose, Tatsuo Shoji and Masatake Iwasaki, Yakugaku Zasshi 81, 1045 (1961), the disclosure of which is hereby incorporated by reference.

The invention will be understood more readily by reference to the following examples; however, these examples are intended to illustrate the invention and are not to be construed to limit the scope of the invention.

EXAMPLE 1

4.96 g pyrazine-2-carboxylic acid is refluxed with 2.9 ml thionyl chloride in 50 ml anhydrous benzene for approximately 12 hours. Benzene and thionyl chloride excess is removed by distillation. Then some anhydrous dioxane is added, and this acid choride solution is allowed to drop into 8 g p-(β-aminoethyl)-benzene-sulphonamide suspension in dioxane and 6.5 ml anhydrous pyridine. The resulting mixture is then refluxed for 3 hours. Dioxane is removed by distillation and then the residue is washed with water and acetic acid. The raw acylated sulphonamide is then filtered and crystallized from 95% ethanol, thus obtaining 4.2 g, of product, of m.p. 220°–222°C.

4 g of the compound so obtained is suspended in 6.4 ml mixture of NaOH 2N and 50 ml acetone; 1.5 g cyclo-hexyl-isocyanate is added drop-after-drop to this suspension, with temperature maintained at from 0° to 5°C. The mixture is stirred for 3 hours at room temperature, diluted with water, separated by filtration from the undissolved products, and the filtrate is acidified with 50 ml of diluted hydrochloric acid. N{4-[β-(pyrazine-2-carboxy-amido)-ethyl]-benzene-sulphonyl-}-N'-cyclohexyl-urea separates and after recrystallization from ethanol, 2.9 g of product are obtained, of m.p. = 174°–176°C.

In similar manner, other pyrazine derivatives are obtained by the substitution of the indicated compounds for the pyrazine-2-carboxylic acid of Example I, as follows: N-{4-[β-(6-methoxy-pyrazine-2-carboxy-amido)-ethyl]-benzene-sulphonyl}-N'-cyclo-hexyl-urea, m.p. 167°–168° C. (crystallization solvent: ethanol), starting from 6-methoxy-pyrazine-2-carboxylic acid; N-{4-[β-(6-chloro-pyrazine-2-carboxy-amido)-ethyl]-benzene-sulphonyl}-N'-cyclo-hexyl-urea, m.p. 170° C. (crystallization solvent: ethanol), starting from 6-chloro-pyrazine-2-carboxylic acid; N-{4-[β-(5-methyl-pyrazine-2-carboxy-amido)-ethyl]-benzene-sulphonyl}-N'-cyclo-hexyl-urea, m.p. 200°–203° C. (crystallization solvent:ethanol), starting from 5-methyl-pyrazine-2-carboxylic acid; N-{4-[β-(2,3-dimethyl-pyrazine-5-carboxy-amido)-ethyl]-benzene-sulphonyl}-N'-cyclo-hexyl-urea, m.p. 165°–167°C. (crystallization solvent:ethanol), starting from 2,3-dimethyl-pyrazine-5-carboxylic acid; N-{4-[β-(2-chloro-5,6-dimethyl-pyrazine-3-carboxy-amido)-ethyl]-benzene-sulphonyl}-N'-cyclo-hexyl-urea, m.p. 192°–193° C. (crystallization solvent:ethanol), starting from 2-chloro-5,6-dimethyl-pyrazine-3-carboxylic acid; N-{4-[β-(5-methoxy-pyrazine-2-carboxy-amido)-ethyl]-benzene-sulphonyl}-N'-cyclo-hexyl-urea (crystallization solvent: ethanol), starting from 5-methoxy-pyrazine-2-carboxylic acid; N-{4-[β-(3-methoxy-pyrazine-2-carboxy-amido)-ethyl]-benzene-sulphonyl}-N'-cyclo-hexyl-urea, m.p. 204°–206° C. (crystallization solvent:ethanol), starting from 3-methoxy-pyrazine-2-carboxylic acid; N-{4-[β-(6-methyl-pyrazine-2-carboxy-amido)-ethyl]-benzene-sulphonyl}-N'-cyclo-hexyl-urea, m.p. 185°–187° C. (crystallization solvent:ethanol), starting from 6-methyl-pyrazine-2-carboxylic acid; N-{4-[β-(3-chloro-pyrazine-2-carboxy-amido)-ethyl]-benzene-sulphonyl}-N'-cyclo-hexyl-urea, m.p. 192° C. (crystallization solvent:ethanol), starting from 3-chloro-pyrazine-2-carboxylic acid.

EXAMPLE 2

6.9 g 5-methyl-pyrazine-2-carboxylic acid is dissolved in 50 ml anhydrous acetone and 7.02 ml triethylamine, stirred for 15 minutes at 0° C., then added drop-after-drop to 4.78 ml ethyl-chloroformiate, further stirred for 30 minutes and allowed to cool at -5° C. 10 g p-(β-amino-ethyl)-benzene-sulphonamide solution in 50 ml water and 7.02 ml triethylamine is then quickly added to the first solution. The resulting mixture is stirred for 3 hours at room temperature. Acetone is then removed by distillation, and the mixture is acidified with 50 ml of diluted hydrochloric acid. A product separates and is filtered. Crystallization of the filtrate from a mixture of 200 ml ethanol/20 ml water in 4.4 g, of product of m.p. 189°–200° C.

4.4 g of this product is treated as per Example 1 with 50 ml acetone, 10.65 ml 2N NaOH and 2.52 g cyclohexyl-isocyanate. After isolation and crystallization from ethanol, 2.7 g of N-{4-[β-(5-methyl-pyrazine-2-carboxy-amido)-ethyl]-benzene-sulphonyl-}-N'-cyclo-hexyl-urea, m.p. 200°–203° C., is recovered.

In a manner similar to Example 2, with the substitution of the indicated compounds for the 5-methyl-pyrazine-2-carboxylic acid, the following compounds are obtained: N-{4-[β-(6-chloro-pyrazine-2-carboxy-amido)-ethyl-]-benzene-sulphon-yl-}-N'-cyclo-hexyl-urea, m.p. 170° C. (crystallization solvent:ethanol), starting from 6-chloro-pyrazine-2-carboxylic acid; N-{4-[β-(6-methoxy-pyrazine-2-carboxy-amido)-ethyl]-benzene-sulphonyl-}-N'-cyclo-hexyl-urea, m.p. 167°–168° C. (crystallization solvent: ethanol), starting from 6-methoxy-pyrazine-2-carboxylic acid; N-{4-[β-(pyrazine-2-carboxy-amido)-ethyl-]-benzene-sulphonyl-}-N'-cyclo-hexyl-urea, m.p. 174°–176° C. (crystallization solvent:ethanol), starting from pyrazine-2-carboxylic acid; N-{4-[β-(2,3-dimethyl-pyrazine-5-carboxy-amido)-ethyl]-benzene-sulphonyl}-N'-cyclo-hexyl-urea, m.p. 165°–167° C. (crystallization solvent:ethanol), starting from 2,3-dimethyl-pyrazine-5-carboxylic acid; N-{4-[β-(2-chloro-5,6-dimethyl-pyrazine-3-carboxy-amido)-ethyl]-benzene-sulphonyl}-N'-cyclo-hexyl-urea, m.p. 192°–193° C. (crystallization solvent:ethanol), starting from 2-chloro-5,6-dimethyl-pyrazine-3-carboxylic acid; N-{4-[β-5-methoxy-pyrazine-2-carboxy-amido)-ethyl]-benzene-sulphonyl}-N'-cyclo-hexyl-urea (crystallization solvent:ethanol), starting from 5-methoxy-pyrazine-2-carboxylic acid; N-{4-[β-(3-methoxy-pyrazine-2-carboxy-amido)-ethyl]-benzene-sulphonyl}-N'-cyclo-hexyl-urea, m.p. 204°–206° C. (crystallization solvent:ethanol), starting from 3-methoxy-pyrazine-2-carboxylic acid; N-{4-[β-(6-methyl-pyrazine-2-carboxy-amido)-ethyl]-benzene-sulphonyl}-N'-cyclo-hexyl) urea, m.p. 185°–187° C. (crystallization solvent:ethanol), starting from 6-methyl-pyrazine-2-carboxylic acid; N-{4-[β-(3-chloro-pyrazine-2-carboxy-amido)-ethyl]-benzene-sulphonyl}-N'-cyclo-hexyl-urea, m.p. 192° C. (crystallization solvent:ethanol), starting from 3-chloro-pyrazine-2-carboxylic acid.

EXAMPLE 3

9 g N-{4-[β-(3-chloro-pyrazine-2-carboxy-amido)-ethyl]-benzene-sulphonyl}-methyl-urethane, is suspended in 150 ml xylol and 2 g cyclo-hexyl-amine is then added to the suspension and the resulting mixture is heated at{140° C. under strong stirring. Xylol is separated by decantation, and then recrystallization from ethanol results in N-{4-[β-(3-chloro-pyrazine-2-carboxy-amido)-ethyl]-benzene-sulphonyl}-N'-cyclo-hexyl-urea, m.p. 192°C.

By this process, the other compounds listed in Example 1 can also be prepared.

EXAMPLE 4

3.04 g of 2,3-dimethyl-pyrazine-5-carboxylic acid is allowed to react with 2.5 ml of thionyl-chloride in 25 ml anhydrous benzene for approximately 12 hours. Then benzene and excess thionyl-chloride are removed by distillation. The mixture is then treated with 25 ml anhydrous chloroform, and the resulting acid chloride solution is allowed to drop into 6.5 g of N-{4-[β-amino-ethyl]-benzene-sulphonyl}-N'-cyclo-hexyl-urea suspension in 25 ml chloroform and 3.65 ml anhydrous pyridine. The resulting mixture is refluxed for 6 hours and chloroform is then removed by distillation.

The residue is washed repeated with 1% $NH_4OH$, and then filtered and acidified with 5% hydrochloridic acid; whereupon a raw substance separates and is filtered. Crystallization from ethanol results in 3.2 g of N-{4-[β-(2,3-dimethyl-pyrazine-5-carboxy-amido)-ethyl]-benzene-sulphonyl}-N'-cyclo-hexyl-urea, of m.p. 165°–167° C.

The compounds of the present invention were tested for hypoglycemic activity using male New Zealand white rabbits which had been starved for sixteen hours. The results of the hypoglycemic tests are shown in Table I below, wherein the indicated compound was administered to the rabbits by injection at the indicated dosage level (all values represent an average of six test animals). The sugar levels in the blood of the test animals was determined immediately before treatment and at 3 and 6 hours after injection of the respective compounds, and the values reported in Table I indicate the reduction of the blood sugar content from the initial values.

ethyl]-benzene-sulphonyl}-N'-cyclo-hexyl-urea, may be used in the treatment of diabetic conditions. The compounds of the present invention may be administered by injection or by suppositories, but the preferred method of administration is by oral tablet.

Regardless of the method of administration, the preferred dosage to adults suffering from diabetic conditions is 2.5 to 15 milligrams, preferably 5 to 10 milligrams. It will be appreciated that when the compounds of this invention are administered orally, they will normally be associated with an inert pharmaceutically acceptable carrier.

We claim:

1. A compound of the formula $$R_2 \underset{R_3}{\overset{N}{\diagdown}} \underset{N}{\overset{}{\diagup}} R_1 - CONH-CH_2-CH_2- \text{(phenyl)} - SO_2NHCONHR_4$$

Formula I wherein $R_1$, $R_2$ and $R_3$ are independently selected from the group consisting of hydrogen, halogen, lower alkyl, lower alkoxy and amino, and $R_4$ is selected from the group consisting of lower alkyl and cycloaliphatic of five to eight carbon atoms.

2. The compound as claimed in claim 1, wherein said cycloaliphatic radical is a cycloalkyl radical of five to six carbon atoms.

3. The compound as claimed in claim 1 wherein said compound is N-{4-[β-(pyrazine-2-carboxy-amido)-ethyl]-benzene-sulphonyl}-N'-cyclo-hexyl-urea.

4. The compound as claimed in claim 1 wherein said com-

TABLE 1

[Percent glycemic reduction towards values before treatment]

| Compound | Dosage, mg./kg. | Hours after treatment 3:00 | 6:00 |
|---|---|---|---|
| N-{4-[β-(pyrazine-2-carboxy-amido)-ethyl]-benzene-sulphonyl}-N'-cyclo-hexyl-urea. | 3.0<br>0.3 | ---------<br>--------- | 26<br>6 |
| N-{4-[β-(6-methoxy-pyrazine-2-carboxy-amido)-ethyl]-benzene-sulphonyl}-N'-cyclo-hexyl-urea. | 7.5<br>1.5 | ---------<br>--------- | 33%<br>20% |
| N-{4-[β-(6-chloro-pyrazine-2-carboxy-amido)-ethyl]-benzene-sulphonyl}-N'-cyclo-hexyl-urea. | 7.5 | --------- | 25 |
| N-{4-[β-(5-methyl-pyrazine-2-carboxy-amido)-ethyl]-benzene-sulphonyl}-N'-cyclo-hexyl-urea. | 1.5<br>0.3 | 46<br>31 | 55<br>50 |
| N-{4-[β-(2,3-dimethyl-pyrazine-5-carboxy-amido)-ethyl-]-benzene-sulphonyl}-N'-cyclo-hexyl-urea. | 1.5<br>0.3 | 42<br>28 | 46<br>35 |
| N-{4-[β-(3-chloro-pyrazine-2-carboxy-amido)-ethyl-]-benzene-sulphonyl}-N'-cyclo-hexyl-urea. | 7.5<br>1.5 | 26<br>10 | 29<br>10 |
| N-{4-[β-(2-chloro-5,6-dimethyl-pyrazine-3-carboxy-amido)ethyl]-benzene-sulphonyl}-N'-cyclo-hexyl-urea. | 7.5<br>1.5 | 26<br>13 | 33<br>23 |
| N-{4-[β-(3-methoxy-pyrazine-2-carboxy-amido)ethyl]-benzene-sulphonyl}-N'-cyclo-hexyl-urea. | 7.5 | 16 | 19 |
| N-{4-[β-(6-methyl-pyrazine-2-carboxy-amido)ethyl]-benzene-sulphonyl}-N'-cyclo-hexyl-urea. | 7.5 | 28 | 35 |

The above data suggests that the compounds of the present invention, e.g.: N-{4-[β-(pyrazine-2-carboxyamido)-ethyl]-benzene-sulphonyl}-N'-cyclo-hexyl-urea; N-{4-[β-(6-methoxy-pyrazine-2-carboxy-amido)-ethyl]-benzene-sulphonyl}-N'-cyclo-hexyl-urea; N-{4-[β-(6-chloro-pyrazine-2-carboxy-amido)-ethyl]-benzene-sulphonyl}-N'-cyclo-hexyl-urea; N-{4-[β-(5-methyl-pyrazine-2-carboxy-amido)-ethyl]-benzene-sulphonyl}-N'-cyclo-hexyl-urea; N-{4-[β-(2,3-dimethyl-pyrazine-5-carboxy-amido)-ethyl]-benzene-sulphonyl}-N'-cyclo-hexyl-urea; N-{4-[β-(3-chloro-pyrazine-2-carboxy-amido)-ethyl]-benzene-sulphonyl}-N'-cyclo-hexyl-urea; N-{4-[β-(2-chloro-5,6-dimethyl-pyrazine-3-carboxy-amido)-ethyl]-benzene-sulphonyl}-N'-cyclo-hexyl-urea; N-{4-[β-(3-methoxy-pyrazine-2-carboxy-amido)-ethyl]-benzene-sulphonyl}-N'-cyclo-hexyl-urea; N-{4-[β-(6-methyl-pyrazine-2-carboxy-amido)-ethyl]-benzene-sulphonyl}-N'-cyclo-hexyl-urea; and N-{4-[β-(5-methoxy-pyrazine-2-carboxy-amido)-ethyl]-benzene-sulphonyl}-N'-cyclo-hexyl-urea.

5. The compound as claimed in claim 1 wherein said compound is N-{4-[β-(6-chloro-pyrazine-2-carboxy-amido)-ethyl]-benzene-sulphonyl}-N'-cyclo-hexyl-urea.

6. The compound as claimed in claim 1 wherein said compound is N-{4-[β-(5-methyl-pyrazine-2-carboxy-amido)-ethyl]-benzene-sulphonyl}-N'-cyclo-hexyl-urea.

7. The compound as claimed in claim 1 wherein said compound is N-{4-[β-(2,3-dimethyl-pyrazine-5-carboxy-amido)-ethyl]-benzene-sulphonyl}-N'-cyclo-hexyl-urea.

8. The compound as claimed in claim 1 wherein said compound is N-{4-[β-(3-chloro-pyrazine-2-carboxy-amido)-ethyl]-benzene-sulphony}-N'-cyclo-hexyl-urea.

9. The compound as claimed in claim 1 wherein said compound is N-{4-[β-(2-chloro-5,6-dimethyl-pyrazine-3-carboxy-amido)-ethyl]-benzene-sulphonyl}-N'-cyclo-hexyl-urea.

10. The compound as claimed in claim 1 wherein said compound is N-{4-[β-(3-methoxy-pyrazine-2-carboxy-amido)-ethyl]-benzene-sulphonyl}-N'-cyclo-hexyl-urea.

11. The compound as claimed in claim 1 wherein said compound is N-{4-[β-(6-methyl-pyrazine-2-carboxy-amido)-ethyl]-benzene-sulphonyl}-N'-cyclo-hexyl-urea.

12. The compound as claimed in claim 1 wherein said compound is N-{4-[β-(5-methoxy-pyrazine-2-carboxy-amido)-ethyl]-benzene-sulphonyl}-N'-cyclo-hexyl-urea.

13. Process for the preparation of a compound of the formula

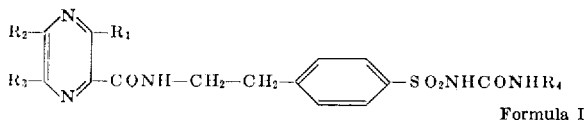

Formula I wherein $R_1$, $R_2$ and $R_3$ are independently selected from the group consisting of hydrogen, halogen, lower alkyl, lower alkoxy, hydroxy, amino, acetylamino and phenyl, wherein the lower alkyl, lower alkoxy and phenyl radicals may be substituted by at least one member selected from the group consisting of halogen, lower alkyl, lower alkoxy, $R_4$ is selected from the group consisting of lower alkyl, lower alkenyl and cycloaliphatic of five to eight carbon atoms, wherein the cycloaliphatic radical may be substituted by at least one member selected from the group consisting of lower alkyl and lower alkoxy, said process comprising reacting at a temperature of 0° to 200° C. a first compound of the formula

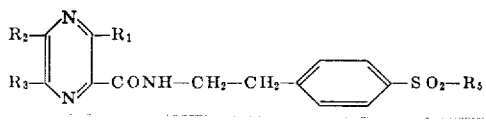

wherein $R_5$ is an isocyanate or amino group or a urethane or urea residue with a second compound of the formula $R_4Y$ wherein Y is an amine or an isocyanate radical.

14. The process as claimed in claim 13 wherein $R_5$ is selected from the group consisting of

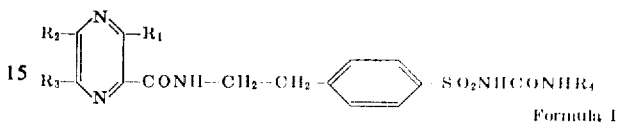

15. Process for the preparation of a compound of the formula

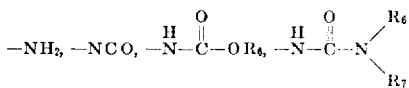

Formula I wherein $R_1$, $R_2$ and $R_3$ are independently selected from the group consisting of hydrogen, halogen, lower alkyl, lower alkoxy, hydroxy, amino, acetylamino and phenyl, wherein the lower alkyl, lower alkoxy and phenyl radicals may be substituted by at least one member selected from the group consisting of halogen, lower alkyl, lower alkoxy, $R_4$ is selected from the group consisting of lower alkyl, lower alkenyl and cycloaliphatic of five to eight carbon atoms, wherein the cycloaliphatic radical may be substituted by at least one member selected from the group consisting of lower alkyl and lower alkoxy, said process comprising reacting at temperature of 0° to 160° C. a first compound of the formula

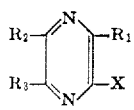

wherein X is a carboxy group, an acid halide or a mixed anhydride, with a compound of the formula

* * * * *